United States Patent
Hanson et al.

(10) Patent No.: US 9,367,836 B2
(45) Date of Patent: Jun. 14, 2016

(54) SYSTEM FOR PROCESSING AND TRACKING MERCHANT DEPOSITS

(71) Applicant: BANK OF AMERICA CORPORATION, Charlotte, NC (US)

(72) Inventors: Carrie Anne Hanson, Charlotte, NC (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 13/713,493

(22) Filed: Dec. 13, 2012

(65) Prior Publication Data

US 2014/0166743 A1    Jun. 19, 2014

(51) Int. Cl.
  *G06K 19/06*   (2006.01)
  *G06Q 20/10*   (2012.01)
  *G07F 19/00*   (2006.01)
  *G06Q 20/30*   (2012.01)

(52) U.S. Cl.
  CPC ...... *G06Q 20/1085* (2013.01); *G06K 19/06037* (2013.01); *G07F 19/202* (2013.01); *G06Q 20/30* (2013.01)

(58) Field of Classification Search
  CPC .......................... G06Q 20/30; G06K 19/06037
  USPC ....................................................... 235/379
  See application file for complete search history.

(56) References Cited

U.S. PATENT DOCUMENTS

| | | |
|---|---|---|
| 2002/0165871 A1* | 11/2002 | Cira et al. ............ 707/500 |
| 2003/0221108 A1 | 11/2003 | Rupp |
| 2004/0210515 A1* | 10/2004 | Hughes .............. 705/39 |
| 2005/0108164 A1* | 5/2005 | Salafia et al. ........ 705/42 |
| 2007/0170240 A1 | 7/2007 | Grant et al. |
| 2009/0108057 A1 | 4/2009 | Mu et al. |
| 2009/0121010 A1* | 5/2009 | Ireland et al. ........ 235/379 |
| 2011/0210826 A1* | 9/2011 | Nichols et al. ....... 340/10.1 |
| 2012/0085829 A1 | 4/2012 | Ziegler |

OTHER PUBLICATIONS

Parasha, Sonu: "QR Codes Generators"; http://www.selfgrowth.com/print/4897371; SelfGrowth.com, May 30, 2012.
Kats, Rimma: "Coca-Cola affirms mobile strategy with interactive QR code push"; http://www.mobilemarketer.com/cms/news/software-technology/12955.html; Mobile Marketer, May 31, 2012.

* cited by examiner

*Primary Examiner* — Toan Ly
(74) *Attorney, Agent, or Firm* — Michael A. Springs; Moore & Van Allen PLLC; Peter B. Stewart

(57) ABSTRACT

Embodiments of the invention are directed to systems, methods, and computer program products for processing and tracking merchant deposits. An exemplary apparatus is configured to receive a deposit package that contains one or more deposit items which have been placed in the deposit package by a merchant. The deposit package may also contain and/or be coupled with visual indicia that has been created by the merchant. The visual indicia may specify information about the one or more deposit items placed in the deposit package. The apparatus may be further configured to read the visual indicia upon receiving the deposit package and track the deposit package based at least partially on the visual indicia.

16 Claims, 6 Drawing Sheets

SYSTEM FOR PROCESSING AND TRACKING MERCHANT DEPOSITS

BACKGROUND

Typically, processing a deposit can be a very manual task that includes deposits being handled multiple times by various individuals. As such, the system is prone to numerous errors associated with manual cash handling. Furthermore, in an instance where a deposit is made via a deposit box, the user has no way to view the status of and/or track their deposit after the money has left their hands.

Therefore, there is a need for a system that allows users to electronically process and track cash deposits within the cash handling system.

BRIEF SUMMARY

Embodiments of the invention are directed to systems, methods, and computer program products for processing and tracking merchant deposits. The system may include an apparatus for processing and tracking merchant deposits. The apparatus may include a plurality of components such as a memory, a computer processing device operatively coupled to the memory, and a module stored in the memory, executable by the computer processing device, and configured to perform a number of method steps. In an exemplary embodiment, the apparatus is configured to receive a deposit package containing one or more deposit items placed in the deposit package by a merchant. The deposit package may also contain and/or be coupled with visual indicia created by the merchant. The visual indicia may specify information about the one or more deposit items placed in the deposit package. Upon receiving the deposit package, the apparatus is further configured to read the visual indicia and obtain information regarding the one or more deposit items. Based at least partially on information specified by the visual indicia, the apparatus may also be configured to track the deposit package.

In other embodiments, the apparatus is configured to perform a plurality of additional steps for processing and tracking merchant deposits. Such steps may include crediting a merchant account based at least partially on information specified by the visual indicia. The apparatus may also be configured to verify the contents of the deposit package based at least partially on the information specified by the visual indicia. In some embodiments, while verifying the contents of the deposit package, if an error is detected, an alert is sent to one or more entities notifying them of the error. Other steps include receiving a request for the status of the deposit package. In some embodiments, the deposit package is tracked based at least partially on the request for the status of the deposit package. The apparatus may also be configured to send deposit information to one or more entities. In some embodiments, in response to receiving the deposit package, the apparatus is configured to verify the merchant associated with the deposit package.

In some embodiments, the deposit package comprises one or more key features for processing and tracking merchant deposits. Key features may include an electronic entry method for inputting and/or providing information regarding one or more deposit items. Key features may also include a means for electronically displaying visual indicia.

The system may also include computer program products for processing and tracking merchant deposits. The computer program products may include a non-transitory computer-readable medium comprising a set of codes for causing a computer to receive a deposit package containing one or more deposit items, read visual indicia coupled with the deposit package such that upon reading the visual indicia information is obtained about the one or more deposit items, and track the deposit package based at least partially on the information specified by the visual indicia.

BRIEF DESCRIPTION OF THE DRAWINGS

Figure 1:
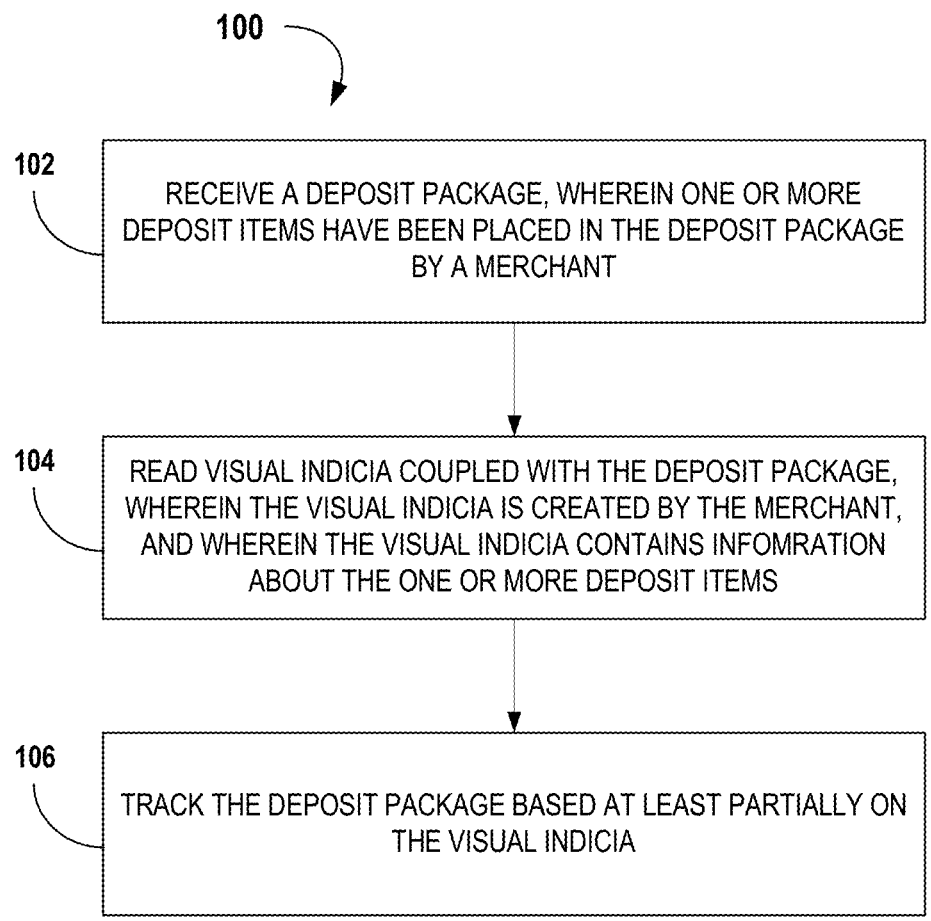
Figure 2:
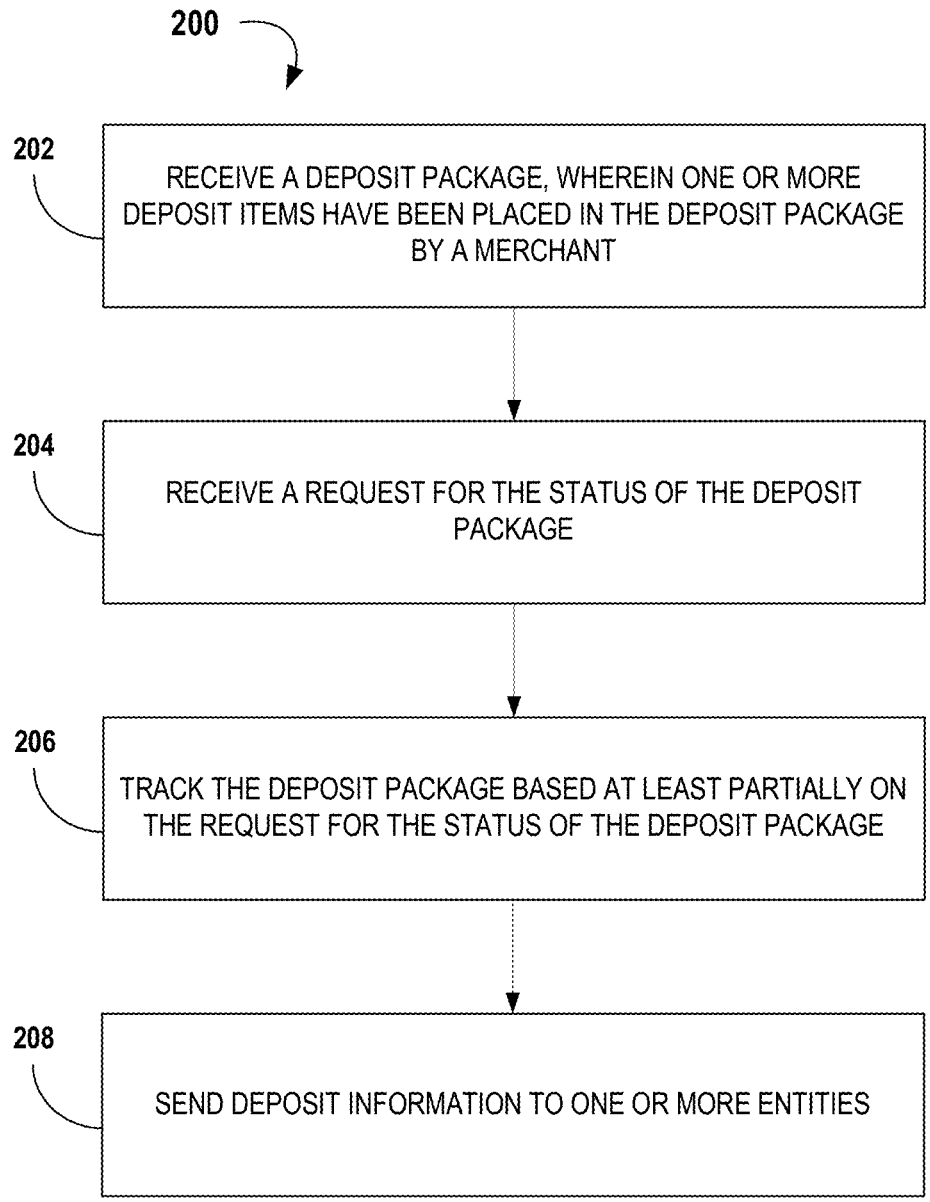
Figure 3:
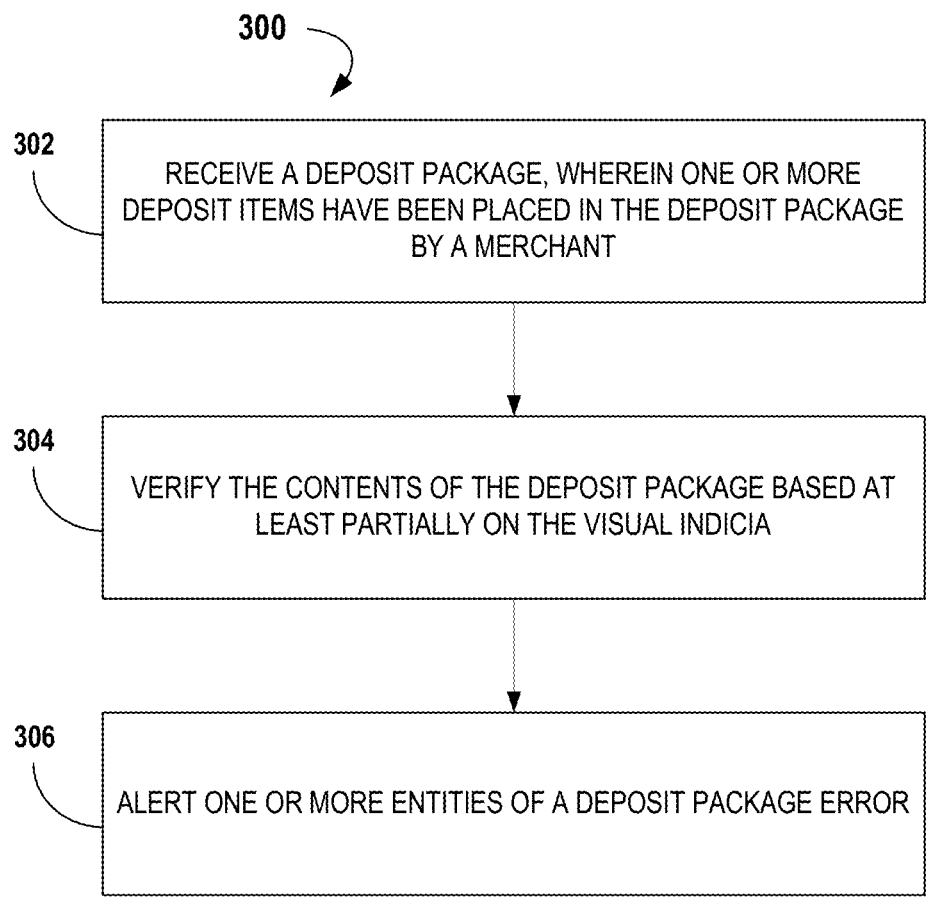
Figure 4A:
Figure 4B:
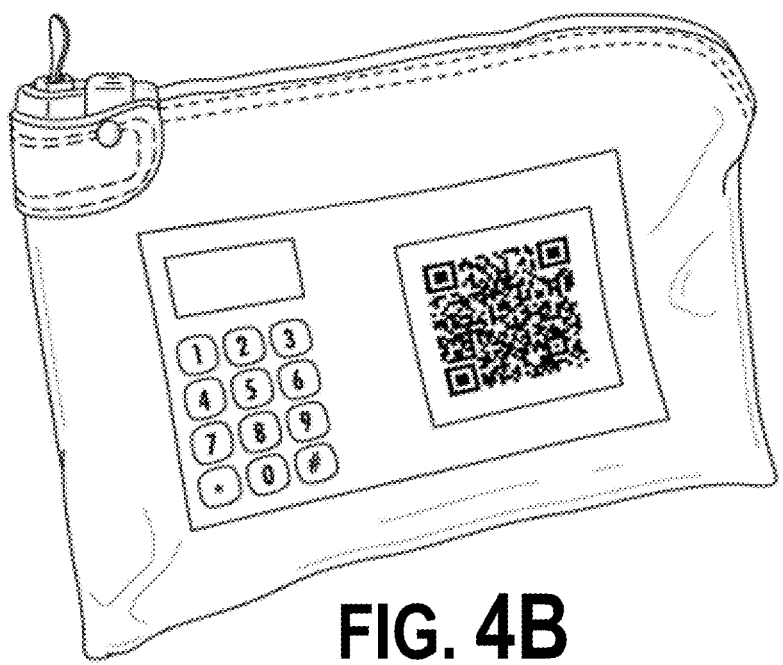
Figure 4C:
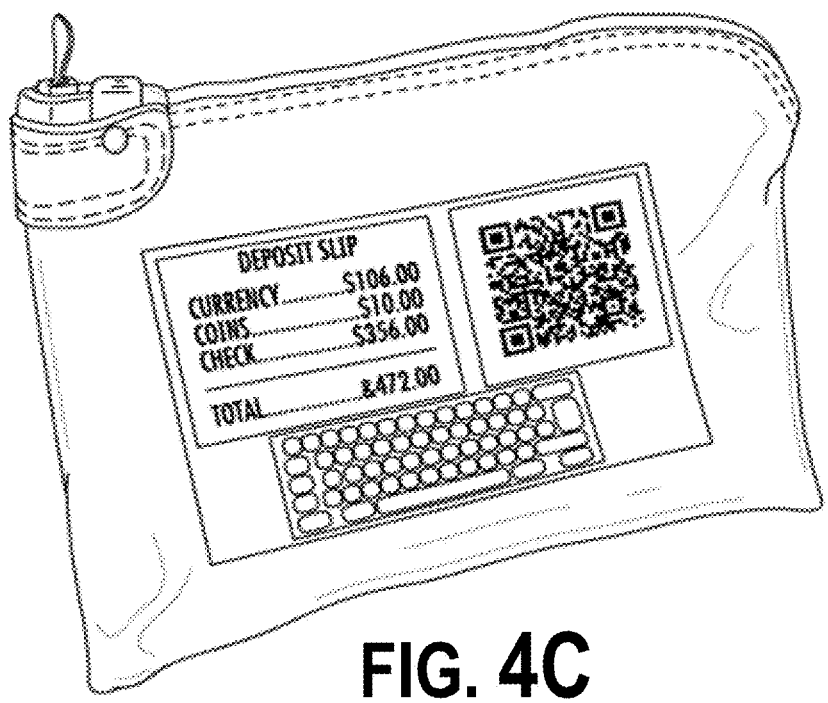
Figure 5:
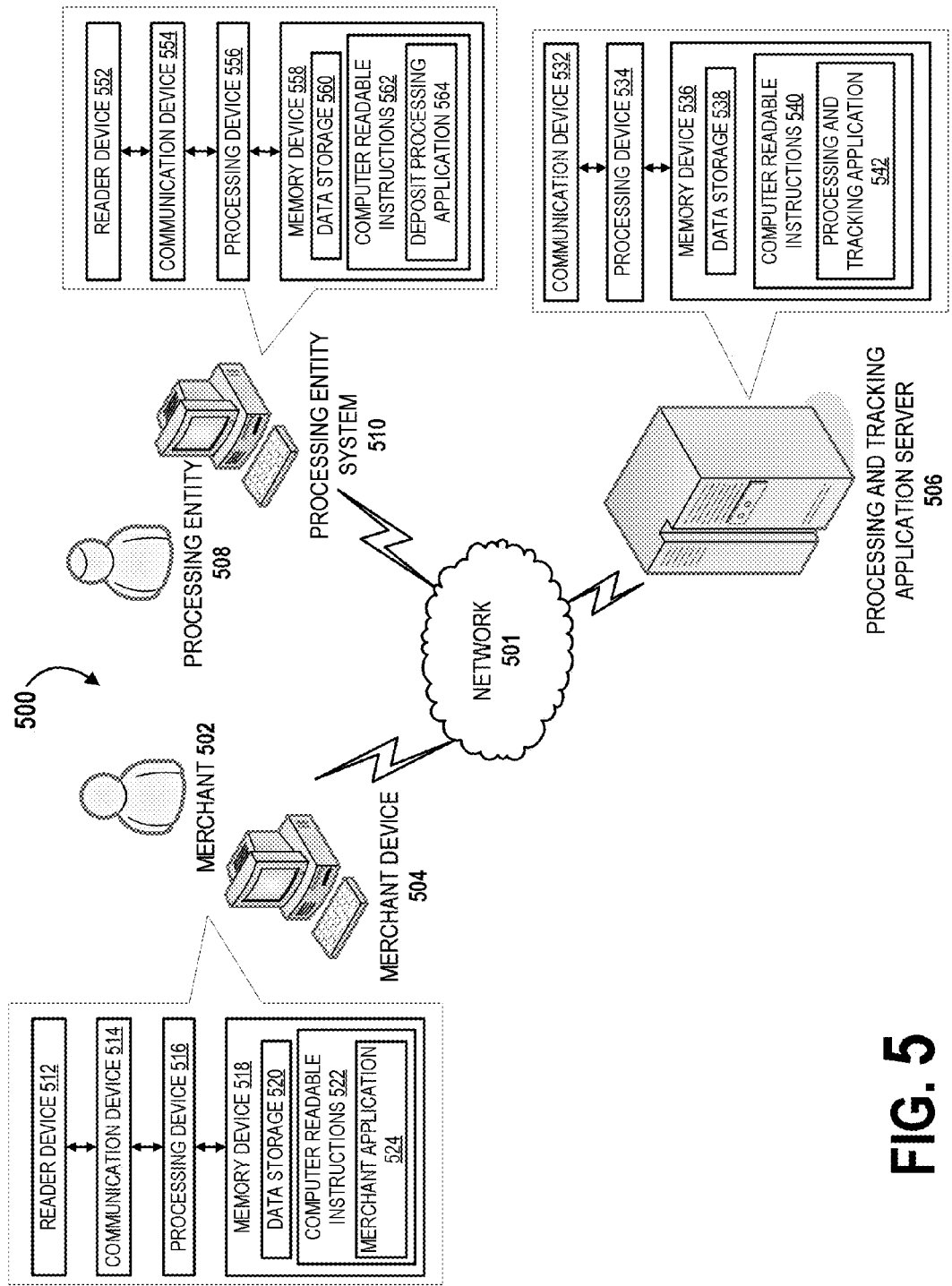

Having thus described embodiments of the invention in general terms, reference will now be made to the accompanying drawings, where:

FIG. 1 is a flowchart illustrating a general process flow for processing and tracking merchant deposits, in accordance with embodiments of the present invention;

FIG. 2 is a flowchart illustrating a general process flow for tracking merchant deposits, in accordance with embodiments of the present invention;

FIG. 3 is a flowchart illustrating a general process flow for verifying merchant deposits, in accordance with embodiments of the present invention;

FIG. 4A is a diagram illustrating a deposit package, in accordance with embodiments of the present invention;

FIG. 4B is a diagram illustrating an electronic deposit package, in accordance with embodiments of the present invention;

FIG. 4C is a diagram illustrating an electronic deposit package, in accordance with embodiments of the present invention; and FIG. 5 is a diagram illustrating a system environment for processing and tracking merchant deposits, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for processing and tracking a merchant deposit. The invention enables a merchant to create a deposit of checks and cash for placement in a deposit package. The invention further enables the user to input various data about the deposit such as the information concerning the amount different cash denomination(s), deposited check(s) details, merchant information and the like. Based on this information visual indicia, such as a QR code, can be created and placed on the deposit package. Visual indicia may remain with the deposit package throughout its travel while the deposit is being processed. The visual indicia may be used to confirm the contents of the deposit package and for tracking purposes.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself.

A "merchant" as used herein may refer to a manufacturer, retailer, service provider, event provider, warehouse, supplier, and/or the like. In some embodiments, the "merchant" may be a customer (e.g., an account holder or a person who has an account (e.g., banking account, credit account, or the like) at the entity) or potential customer (e.g., a person who has submitted an application for an account. As used herein the terms merchant and user may be used interchangeably.

Referring now to FIG. 1, a method for processing and tracking merchant deposits 100, in accordance with an embodiment of the present invention is provided. At event 102, a deposit package is received by a deposit processing entity. The deposit processing entity may be a financial institution, an individual, or a collection of individuals such as a business/organization capable of processing a monetary deposit. As used herein, a deposit package may refer to any housing capable of storing items for deposit. A deposit package may be embodied by deposit bags, envelopes, boxes, carrier truck and the like. In one embodiment, the deposit package may be a combination of items. For example, the deposit package may comprise a plurality of small envelopes enclosed in a deposit bag.

The deposit package may contain a plurality of items. In an exemplary embodiment, the deposit package contains one or more deposit items. The deposit item(s) may be placed in the deposit package by a merchant. One or more deposit items collectively form a monetary deposit to be processed by a deposit processing entity. As used herein, a deposit item may refer to foreign and domestic currency (e.g. cash and/or coins), checks, money orders, vouchers and the like.

Deposit packages may be received in a variety of ways. In one embodiment, the deposit package is received via an automated teller machine and/or another self-service device. In such an embodiment, the merchant may access the ATM using various user credentials. In one embodiment, user credentials are any means by which the merchant's identity can be authenticated. User credentials may include, but not be limited to a magnetic-based payment device (e.g., a credit card, debit card, and the like), a personal identification number (PIN), a signature, an electronic signature, a contactless payment device (e.g., a key fob), a radio frequency identification device (RFID), and the like. In some embodiments, a combination of user credentials is used to authenticate a merchant's identity. In another embodiment, the deposit package may be received in a more traditional form such as via a drop box. As used herein, the terms "drop box" and "deposit box" may be used interchangeably.

In another embodiment, the deposit package is received via a mailing system. As used herein, mailing systems may refer to both traditional and non-traditional forms of sending and receiving deposit packages. In one embodiment, the mailing system may be a postal service (e.g. post office, courier-transportation service, parcel service, and the like). In such an embodiment, the deposit package can be received by an in-person exchange between the merchant and an employee of the postal service, received by a pick-up exchange between the merchant and employee of the postal service and/or the like. The postal service can then transport the deposit package to the respective deposit processing entity where they may receive the deposit package. In such an embodiment, the deposit package may be received via an electronic means such as scanning and/or sorting the deposit package. In another embodiment, the deposit package is received via an electronic mailing system. In such an embodiment, an electronic image of the one or more deposit items may be captured and sent to the depositing entity. The electronic image may be sent via email, text, sms, social networking sites, and the like. In yet another embodiment, the deposit package is received through an in-person exchange between the deposit entity and a merchant. For example, the deposit entity may be a financial institution. As such, the deposit package may be received in person by a teller at a banking branch associated with the financial institution. In such an embodiment, the deposit package may be received via an electronic means such as scanning and/or sorting the deposit package.

The system also enables a merchant to create visual indicia to be coupled with the deposit package. Means for coupling visual indicia with the deposit package may include, but not be limited to, placing visual indicia inside the deposit package and/or adhering visual indicia to the outside of the deposit package (as shown in FIG. 4A) using stickers, shipping tags, tag inserts, electronic displays (as shown in FIGS. 4B and 4C), and the like. As used herein, visual indicia may include but not be limited to a one dimensional code (e.g., a barcode), a two dimensional code (e.g., a quick response (QR) code), a hologram, rotating graphics, an alphanumeric code and the like. As used herein, when referring to a "QR code", it is intended that any type of code may serve as an alternative to the QR code in various other embodiments of the invention. The visual indicia may specify information about the one or more deposit items placed in the deposit package by the merchant. The information specified by visual indicia may include, but not be limited to merchant name, merchant address, routing number(s), account number(s), account type, deposit date, deposit amount, deposit type, electronic signature, and the like.

Visual indicia can be created using various methods. In one embodiment, visual indicia are created by the merchant using a computing device. A computing device may be embodied by a computer, (e.g., a personal computer, tablet computer, desktop computer, server, laptop, and the like), a mobile device (e.g., a smartphone, cellular phone, personal digital assistant (PDA) device, MP3 device, personal GPS device, and the like), a merchant terminal, a self-service machine (e.g., self-checkout machine, and the like), a public and/or business kiosk (e.g., an Internet kiosk, ticketing kiosk, bill pay kiosk, and the like), a gaming device and/or various combinations of the foregoing. The computing device may also be coupled with a printing device. In this way, the visual indicia may be printed and placed with the deposit package. For example, in one embodiment, visual indicia is created and printed on a label. The label is then placed on deposit package. In an alternative embodiment, the visual indicia can be printed and placed inside the deposit package with the one or more deposit items. In addition to a computing device, the merchant may further use an online application, such as an online banking portal to create visual indicia. For example, creating visual indicia can comprise a merchant logging into an online banking portal and entering information about one or more deposit items. The information entered can then be encoded into visual indicia such that the visual indicia may be placed with the deposit package.

In another embodiment, visual indicia may be electronically rendered on the deposit package. For example, the deposit package may comprise an electronic display and electronic means for entering information (e.g. a key pad). In one embodiment, a merchant may receive an alphanumeric code after entering information about the one or more deposit items in the online banking portal. Upon entering the alphanumeric code on the keypad of the deposit package, the visual indicia may be electronically rendered on the deposit package. In another embodiment, the merchant may be able to enter deposit information directly into the deposit package such that visual indicia specifying information about one or more deposit items is rendered on an electronic display associated with the deposit package.

In an alternative embodiment, the deposit processing entity may provide the merchant with visual indicia that specifies information about the one or more deposit items placed in the deposit package. In one embodiment, the merchant may receive visual indicia from the deposit processing entity to specify information for a static deposit. For example, a merchant may make a daily deposit of $1000 with a depositing processing entity. As such, the merchant may receive a plurality of QR codes from the depositing entity which indicate that the deposit amounts to $1000. In another embodiment, the deposit processing entity may provide the merchant with visual indicia via an ATM. For example, the merchant may enter information about one or more deposit items via the ATM and receive a printed form of visual indicia that can be coupled with the deposit package.

At event 104, the visual indicia coupled with the deposit package may be read. An entity may obtain information about the one or more deposit items placed in the deposit package by reading the visual indicia coupled with the deposit package. By reading the visual indicia a deposit entity may obtain information such as a merchant name, merchant address, routing number(s), account number(s), account type, deposit date, deposit amount, deposit type, electronic signature, and the like. Visual indicia may be read using a barcode scanner, a radio frequency (RF) reader, a character recognition device, a magnetic ink reader, a processor for interpreting codes presented over an electrical or optical medium, a biometric reader, a wireless receiving device, and/or the like. In one embodiment, reading visual indicia may comprise passing one or more deposit packages through a scanning zone. The scanning zone may be equipped with a means for scanning packages as they pass through. For example, the scanning zone may also comprise a transport belt and a laser scanner. In this way, any deposit package placed face up on the scanning belt such that the visual indicia is visible, may be scanned by the laser scanner as it passes through the scanning zone. This feature eliminates the process of an individual being tasked with manually scanning multiple deposit packages.

In one embodiment, in response to reading visual indicia coupled with a deposit package, the deposit processing entity can automatically populate account information on a computing device. In a preferred embodiment, the account information is associated with the merchant making a deposit. Such a feature provides an alternative method for easily accessing merchant account information in contrast to more traditional methods such as manually keying information into a computer.

Reading visual indicia coupled with a deposit package may further comprise updating visual indicia coupled with the deposit package. For example, the visual indicia may be embedded with information that specifies the current location of the deposit package. However, if the location of the deposit package is constantly changing the visual indicia may be updated when the deposit package reaches a new location. In an embodiment, where the visual indicia have been manually printed, updating visual indicia may comprise printing a new label for the deposit package. In an embodiment, where the visual indicia have been electronically displayed, updating the visual indicia may comprise entering updated information into the deposit package to generate new visual indicia. In an alternative embodiment, where the visual indicia have been electronically displayed, the visual indicia may be automatically updated in response to reading the visual indicia. For example, the visual indicia may be embedded with information that specifies the current location of the deposit package. As such, in response to reading the visual indicia the system may send updated location information that is automatically specified by the visual indicia.

In one embodiment, the merchant account may be credited in response to reading the visual indicia. For example, the merchant account may receive a temporary credit equal to the deposit amount indicated by the visual indicia such that upon reading the visual indicia the credit is automatically applied to the merchants account. If any errors are later detected with the deposit, the credit may be reversed or altered prior to being permanently applied to the account. In one embodiment, full or partial deposits may be credited to the merchant account based at least partially on the visual indicia. The visual indicia may specify two deposit accounts associated with the merchant. As such, a merchant may also provide information that specifies a portion of the deposit should be credited to a first account and the remaining deposit amount should be credited to a second account.

At event 106, the merchant deposit is tracked based at least partially on the visual indicia. To this extent visual indicia may be included in the process for tracking a merchant deposit but does not necessarily have to be the exclusive means for tracking a merchant deposit. However, in some embodiments, merchant deposits may be tracked by exclusively using the information specified by the visual indicia coupled with the deposit package. Merchant deposits may be tracked in response to reading the visual indicia. In another embodiment merchant deposits may be tracked in response to receiving a request for the location of the merchant deposit. In another embodiment, the one or more deposit items may be individually tracked. In such an embodiment, the one or more deposit items may contain individual forms of visual indicia. In one embodiment, the one or more deposit items are collectively tracked based on the deposit package. In a similar means, a plurality of merchant deposits may also be tracked. In such an embodiment, multiple deposit packages may be collectively placed in a single enclosure. To this extent, the single enclosure may be coupled with a separate form of visual indicia that specifies information about the multiple deposit packages contained within. As such, deposits may be tracked at various levels such as item level (e.g. single checks and/or cash), deposit package (e.g. one or more deposit items contained in a deposit bag), transport level (e.g. one or more deposit packages).

Deposit packages may be tracked according to various time frames. In one embodiment, a deposit package may be tracked based on real-time updates. In another embodiment, an individual may request for the status of the deposit package during a specific time. The time may be in increments of seconds, minutes, hours, days, weeks, months, years, and the like. In one embodiment, deposit can be tracked from the time they are received up until the deposit is credited to the merchant account. In another embodiment, physical items, such as checks, can be tracked for an extensive time period after the deposit has been made. For example, a plurality of physical checks may be stored in a storage bin after being credited to a merchants count. As such, during an audit, the checks may be tracked to their location in the storage facility.

Referring now to FIG. 2, a method for tracking a merchant's deposit 200, in accordance with an embodiment of the present invention, is provided. At event 202, a deposit package is received by a deposit processing entity. The deposit package may contain a plurality of items. In an exemplary embodiment, the deposit package contains one or more deposit items. The deposit item(s) may be placed in the deposit package by a merchant. One or more deposit items may collectively form a monetary deposit to be processed by a deposit processing entity. As used herein, a deposit item may refer to foreign and domestic currency (e.g. cash and/or coins), checks, money orders, vouchers and the like. In one embodiment, the deposit package may comprise a plurality of deposit packages. For example, a carrier service may transport multiple deposit packages to a financial institution. As such, the multiple deposit packages may collectively form a single deposit package.

Deposit packages may be received in a variety of ways. In one embodiment, the deposit package is received via an automated teller machine and/or another self-service device. In such an embodiment, the merchant may access the ATM using various user credentials. In one embodiment, user credentials are any means by which the merchant's identity can be authenticated. User credentials may include, but not be limited to a magnetic-based payment device (e.g., a credit card, debit card, and the like), a personal identification number (PIN), a signature, an electronic signature, a contactless payment device (e.g., a key fob), a radio frequency identification device (RFID), and the like. In some embodiments, a combination of user credentials is used to authenticate a merchant's identity.

In another embodiment, the deposit package is received via a mailing system. As used herein, mailing systems may refer to both traditional and non-traditional forms of sending and receiving deposit packages. In one embodiment, the mailing system may be a postal service (e.g. post office, courier-transportation service, parcel service, and the like). In such an embodiment, the deposit package can be received by an in-person exchange between the merchant and an employee of the postal service, received by a pick-up exchange between the merchant and employee of the postal service and/or the like. The postal service can then transport the deposit package to the respective deposit processing entity where they may receive the deposit package. In such an embodiment, the deposit package may be received via an electronic means such as scanning and/or sorting the deposit package. In another embodiment, the deposit package is received via an electronic mailing system. In such an embodiment, an electronic image of the one or more deposit items may be captured and sent to the depositing entity. The electronic image may be sent via email, text, sms, social networking sites, and the like. In yet another embodiment, the deposit package is received through an in-person exchange between the deposit entity and a merchant. For example, the deposit entity may be a financial institution. As such, the deposit package may be received in person by a teller at a banking branch associated with the financial institution. In such an embodiment, the deposit package may be received via an electronic means such as scanning and/or sorting the deposit package.

At event 204, the system may receive a request for the status of the deposit package. A request may be received from the depositing merchant or from an individual associated with the deposit processing entity. For example, the deposit processing entity may contain a plurality of departments such that a request for the status of the deposit package may be received from any individual who does not currently have the deposit package in their possession. A request for the status of the deposit package may include a request for various information associated with the deposit being made. In one embodiment, the request may comprise a request for the current location of the deposit package. As such the request may be received internally within a deposit processing entity or by the merchant associated with the deposit being made. In one embodiment, the request may comprise a request for the handling history of the deposit package. As such, an entity may receive one or more current and/or previous statuses associated with the deposit package. For example, if an individual request the location of the deposit package they may receive a timeline of one or more locations and/or check-in times associated with the deposit package. In another embodiment, the request may comprise a request for the status of the deposit itself such as, received, in-process, credited to account, and the like. In one embodiment, a request is sent collectively for the one or more deposit items contained in the deposit package. In another embodiment, a request may be sent for the individual status of the one or more deposit items contained in the deposit package. In such an embodiment, the one or more deposit items may contain individual forms of visual indicia.

Requesting the status of a deposit package may comprise an individual reading the visual indicia associated with the deposit package. For example, by reading the visual indicia associated with a deposit package an entity may receive the history of the deposit package, such as who previously handled the deposit package. In an alternative embodiment, the merchant may have a duplicate copy of the visual indicia coupled with the deposit package such that the merchant can scan the duplicate copy and request for the status of the deposit package associated with the visual indicia. The status of a deposit package may be received automatically in response to reading visual indicia associated with a deposit package. In another example, a request may be received via an online portal. As such, a merchant may access their online banking portal and request for the status of one or more deposit. The online portal may be the same portal used to create visual indicia for the deposit package.

At event 206, the system may track the deposit package based at least partially on the request for the status of the deposit package. In one embodiment, the system may automatically track the deposit package in response to receiving the request. In such an embodiment, the system may gather a plurality of information related to the deposit being made. In an alternative embodiment, the system may only obtain the information specified in the request for the status of the deposit package. Deposit packages may be tracked according to various time frames. In one embodiment, a deposit package may be tracked based on real-time updates. In another embodiment, an individual may request for the status of the deposit package during a specific time. The time may be in increments of seconds, minutes, hours, days, weeks, months, years, and the like.

At event 208, deposit information is sent to one or more entities. The deposit information may reflect the information queried and obtained in response to the request for the status of the deposit package. Deposit information may be sent to an entity in the form of text, sms, email, voice communication(s), and the like. In one embodiment, the information is sent in the manner which the request was received. For example, if a request is received via an online portal then the information is sent to the user via the online portal. In an alternative embodiment, deposit information may be sent in alternative forms from that which the request was received. In yet another embodiment, the deposit information may be sent in a plurality of forms. For example a merchant may send a request for the status of a deposit package. In response to receiving the request the system may track and obtain information about one or more deposit items and send the information to the merchant via email and text message.

Referring now to FIG. 3, a method for verifying a merchant's deposit 300, in accordance with an embodiment of the present invention, is provided. At event 302, a deposit package is received by a deposit processing entity. The deposit package may contain a plurality of items. In an exemplary embodiment, the deposit package contains one or more deposit items. The deposit item(s) may be placed in the deposit package by a merchant. One or more deposit items may collectively form a monetary deposit to be processed by a deposit processing entity. As used herein, a deposit item may refer to foreign and domestic currency (e.g. cash and/or coins), checks, money orders, vouchers and the like.

Deposit packages may be received in a variety of ways. In one embodiment, the deposit package is received via an automated teller machine and/or another self-service device. In such an embodiment, the merchant may access the ATM using various user credentials. In one embodiment, user credentials are any means by which the merchant's identity can be authenticated. User credentials may include, but not be limited to a magnetic-based payment device (e.g., a credit card, debit card, and the like), a personal identification number (PIN), a signature, an electronic signature, a contactless payment device (e.g., a key fob), a radio frequency identification device (RFID), and the like. In some embodiments, a combination of user credentials is used to authenticate a merchant's identity.

In another embodiment, the deposit package is received via a mailing system. As used herein, mailing systems may refer to both traditional and non-traditional forms of sending and receiving deposit packages. In one embodiment, the mailing system may be a postal service (e.g. post office, courier-transportation service, parcel service, and the like). In such an embodiment, the deposit package can be received by an in-person exchange between the merchant and an employee of the postal service, received by a pick-up exchange between the merchant and employee of the postal service and/or the like. The postal service can then transport the deposit package to the respective deposit processing entity where they may receive the deposit package. In such an embodiment, the deposit package may be received via an electronic means such as scanning and/or sorting the deposit package. In another embodiment, the deposit package is received via an electronic mailing system. In such an embodiment, an electronic image of the one or more deposit items may be captured and sent to the depositing entity. The electronic image may be sent via email, text, sms, social networking sites, and the like. In yet another embodiment, the deposit package is received through an in-person exchange between the deposit entity and a merchant. For example, the deposit entity may be a financial institution. As such, the deposit package may be received in person by a teller at a banking branch associated with the financial institution. In such an embodiment, the deposit package may be received via an electronic means such as scanning and/or sorting the deposit package.

At event 304, an entity may verify the contents of the deposit package based at least partially on the visual indicia. The contents of the deposit package may be verified based on the information specified by the visual indicia. For example, the visual indicia may specify information related to the different cash denominations contained in a deposit package. To this extent, the contents of the deposit packaged may be verified based at least partially on this information. In one embodiment, the contents of the deposit package may be verified manually based on the information specified by the visual indicia. For example, in an embodiment where the deposit processing entity is a financial institution, a teller may scan the visual indicia associated with the deposit package and receive information about the different cash denomination contained in the deposit package. As such, the teller may manually count the cash denominations contained within the deposit package and verify the information matches the deposit information specified by the visual indicia. In another embodiment, the contents of the deposit package may be verified electronically based on the information specified by the visual indicia. For example, in an embodiment where the deposit processing entity is a financial institution, the financial institution may scan the visual indicia associated with the deposit package and receive information about the different cash denomination contained in the deposit package. As such, a cash counting device associated with the financial institution may automatically count the cash denominations contained within the deposit package and verify the information matches the deposit information specified by the visual indicia.

At event 306, an alert is sent to one or more entities informing them of an error with the deposit package. This alert may be sent in response to an error being detected while the contents of the deposit package are being verified. In one embodiment, the alert may be sent to the merchant associated with the deposit being made. In another embodiment, the alert may be sent internally to an individual associated with the deposit processing entity. In response to receiving an alert indicating an error with the contents of the deposit package, the system may automatically track the deposit package to determine where the error originated. In one embodiment, the contents of the deposit package are verified internally within the deposit processing entity each time the deposit package is received by a different department within the deposit processing entity.

Referring now to FIG. 5, a system environment 500 for processing and tracking merchant deposits, in accordance with one embodiment of the present invention, is provided. As illustrated in FIG. 5, the application server 505 is operatively coupled, via a network 501 to the merchant device 504, and to the deposit processing system 510. It should be noted that merchant devices 504 could include a merchant account interface or handheld device, as well as a merchant end system, such as a cash register. It should also be noted, in some embodiments the deposit processing entities system 510 may be interchanged with other end systems, such as a computer. In this way, the application server 505 can send information to and receive information from the merchant device 504 and the deposit processing entities system 510 to process and track merchant deposits. FIG. 5 illustrates only one example of an embodiment of a system environment 500 for processing and tracking merchant deposits, and it will be appreciated that in other embodiments one or more of the systems, devices, or servers may be combined into a single system, device, or server, or be made up of multiple systems, devices, or servers. The network 501 may be a global area network (GAN), such as the Internet, a wide area network (WAN), a local area network (LAN), or any other type of network or combination of networks. The network 501 may provide for wireline, wireless, or a combination wireline and wireless communication between devices on the network.

As illustrated in FIG. 5, the application server 506 generally comprises a communication device 532, a processing device 534, and a memory device 536. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 534 is operatively coupled to the communication device 532 and the memory device 536. The processing device 534 uses the communication device 532 to communicate with the network 501 and other devices on the network 501, such as, but not limited to the deposit processing entities system 510 and the merchant device 504. As such, the communication device 532 generally comprises a modem, server, or other device for communicating with other devices on the network 501.

As further illustrated in FIG. 5, the application server 506 comprises computer-readable instructions 540 stored in the memory device 536, which in one embodiment includes the computer-readable instructions 540 of a processing and tracking application 542. In some embodiments, the memory device 536 includes data storage 538 for storing data related to the accounts including but not limited to data created and/or used by the processing and tracking application 542 or the information of consumers 505. The data storage 538 may also store all data received from merchant device 504 and the deposit processing entities system 510 such that the application 542 may process and track merchant deposits.

In the embodiment illustrated in FIG. 5 and described throughout much of this specification, the processing and tracking application 542 allows the merchant 502 to interact with the system. First, the processing and tracking application 542 allows a merchant 502 to create visual indicia that specify information about one or more deposit items, via the merchant device 504. Next, the processing and tracking application 542 allows the deposit processing entity 508 to read the visual indicia and obtain the information about the one or more deposit items via the deposit processing entities system 510. Both creating visual indicia and reading visual indicia may be performed by a using an interface, such as an interface associated with the merchant device 504 or deposit processing entities system 510, provided from the processing and tracking application 542 via a network 501.

In some embodiments, the processing and tracking application 542 allows the merchant 502 to communicate, via the merchant device 504, to request the current status of a merchant deposit. This communication may be in the form of text communications, voice communications, or the like. The status of a merchant deposit may be provided by the deposit processing entity 508 through an interface on the merchant device 504, such as that illustrated in FIG. 5. The processing and tracking application 542 may receive the request from the merchant 504 and forward the request to the deposit processing entity 508. Once the deposit processing entity 508 receives the request they may then provide the current status of the merchant deposit.

As illustrated in FIG. 5, the deposit processing entities system 510 generally comprises a reading device 552, a communication device 554, a processing device 556, and a memory device 558. The reading device 552 is operatively coupled to the processing device 556, communication device 554, and the memory device 558. The deposit processing entities system 510 may include a reader device 535 to read visual indicia from the merchant 504. Such a reader device 535 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 552 receives information that may be used to identify the merchant's 503 deposit account and/or deposit item information at the deposit processing entities system 510 and communicates the information via the communication device 554 over a network 501, to other systems such as, but not limited to the application server 506 and/or the commercial partner systems. As such, the communication device 554 generally comprises a modem, server, or other device for communicating with other devices on the network 501.

As further illustrated in FIG. 5, the deposit processing entities system 510 comprises computer-readable instructions 562 stored in the memory device 558, which in one embodiment includes the computer-readable instructions 562 of a deposit processing application 564. A deposit processing entities system 510 may refer to any device used to process a deposit, either from the merchant's perspective, the deposit processing entities perspective or both. In some embodiments, the deposit processing entities system 510 may refer only to a device associated with the deposit processing entity, in other embodiments it refers only to a merchant device, and in yet other embodiments, it refers to both a deposit processing entities device and a merchant device interacting to process a deposit. For example, in one embodiment, the deposit processing entities system 510 refers to the merchant's device configured to communicate with a processing and tracking application server 506 and create visual indicia, whereas in other embodiments, the deposit processing entities system 510 refers to a device of the deposit processing entity 508 configured to communicate with the processing and tracking application server 506, and in yet other embodiments, the deposit processing entities system 510 refers to both the merchant's device 504 and the device of the deposit processing entity 508 configured to communicate with each other to process a deposit. In one embodiment, the deposit processing entities system 510 may refer to a combination of devices associated with the deposit processing entity such as an ATM and a computer within a banking branch.

The deposit processing entity 508, through the deposit processing entities system 510 may provide the processing and tracking application 542 data with respect to a deposit being made. The processing and tracking application 542 may then store the data related to the deposit being processed by deposit processing entity 508 such as, but not limited to the deposit location, deposit amount, deposit status and the like. In this way, the processing and tracking application 542 may also have access to all request from the merchant 504 and the deposit processing entity, in a database, to utilize to provide a merchant or other entity with information related to the deposit being made.

In some embodiments, a deposit processing entities system 510 is or includes an interactive computer terminal that is configured to initiate, perform, complete, and/or facilitate one or more deposits. A deposit processing entities system 510 could be or include any device that a merchant may use to initiate a deposit with an entity, such as, but not limited to, a magnetic-based payment device (e.g., a credit card, debit card, and the like), a personal identification number (PIN) payment device, a contactless payment device (e.g., a key fob), a radio frequency identification device (RFID) and the like, a computer, (e.g., a personal computer, tablet computer, desktop computer, server, laptop, and the like), a mobile device (e.g., a smartphone, cellular phone, personal digital assistant (PDA) device, MP3 device, personal GPS device, and the like), a merchant terminal, a self-service machine (e.g., vending machine, self-checkout machine, and the like), a public and/or business kiosk (e.g., an Internet kiosk, ticketing kiosk, bill pay kiosk, and the like), a gaming device and/or various combinations of the foregoing.

In the embodiment illustrated in FIG. 5, the deposit processing application 564 allows the deposit processing entities system 510 to be linked to the application server 506 to communicate, via a network 501, the information related to the deposit being made, such as the deposit type, amount of deposit, merchant name, merchant address and the like. In this way, the deposit processing entity application 564 may provide the processing and tracking application 542 with location data and recent deposit data, such that the processing and tracking application 542 may provide the merchant with the relevant information.

FIG. 5 also illustrates a merchant device 504. The merchant device 504 generally comprises a reader device 512, a communication device 514, a processing device 516, and a memory device 518. The processing device 514 is operatively coupled to the communication device 514 and the memory device 515. The processing device 514 uses the communication device 514 to communicate with the network 501 and other devices on the network 501, such as, but not limited to the deposit processing entities system 510, the application server 506. As such, the communication device 514 generally comprises a modem, server, or other device for communicating with other devices on the network 501.

As further illustrated in FIG. 5, the merchant device 504 comprises computer-readable instructions 522 stored in the memory device 518, which in one embodiment includes the computer-readable instructions 522 of a merchant application 524. In this way, a merchant 502 may be input information related to the deposit being made and create visual indicia, and/or the like using the merchant application 524. A "merchant device" 504 may be any communication device, such as a cellular telecommunications device (i.e., a cell phone or mobile phone), personal digital assistant (PDA), a internet accessing device, or other device including, but not limited to portable digital assistants (PDAs), pagers, mobile televisions, gaming devices, laptop computers, cameras, video recorders, audio/video player, radio, GPS devices, any combination of the aforementioned, or the like. Although only a single merchant device 504 is depicted in FIG. 5, the deposit processing and tracking system environment 500 may contain numerous mobile devices 504.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for processing and tracking merchant deposits, the apparatus comprising:
    a memory;
    a computer processing device operatively coupled to the memory; and
    a module stored in the memory, executable by the computer processing device, and configured to cause said computer processing device to:
        receive a deposit package at a financial institution, wherein one or more deposit items have been placed in the deposit package by a merchant;
        read visual indicia coupled with the deposit package, wherein the visual indicia is created by the merchant, and wherein the visual indicia contains information about the one or more deposit items that have been placed in the deposit package by the merchant such that reading the visual indicia further comprises receiving an itemized list of the one or more deposit items that have been placed in the deposit package by the merchant, wherein the itemized list is in an electronic form;
        verify the contents of the deposit package in response to reading the visual indicia, wherein an electronic device automatically determines the contents of the deposit package after it has been received, and wherein the electronic device receives the electronic form of the itemized list such that the contents of the deposit package are verified in response to determining whether or not the contents of the deposit package match the itemized list of the one or more deposit items that have been placed in the deposit package by the merchant; and
        in response to determining the contents of the deposit package do not match the itemized list of the one or more deposit items that have been placed in the deposit package by the merchant, alert the merchant and the financial institution of a deposit package error; and
        in response to receiving the alert, automatically track the deposit package based at least partially on the visual indicia and determine where the deposit package error originated.

2. The apparatus of claim 1, wherein the merchant has a merchant account maintained by the financial institution, and wherein the module is further configured to credit the merchant account based at least partially on the visual indicia.

3. The apparatus of claim 1, wherein the module is further configured to receive a request for the status of the deposit package.

4. The apparatus of claim 3, wherein tracking the deposit package comprises the module being further configured to track the deposit package based at least partially on the request for the status of the deposit package.

5. The apparatus of claim 1, wherein the module is further configured to send deposit information to one or more entities.

6. The apparatus of claim 1, wherein the module is further configured to authenticate the merchant in response to receiving the deposit package at the financial institution.

7. The apparatus of claim 1, wherein the visual indicia is electronically displayed on the deposit package.

8. The apparatus of claim 1, wherein the deposit package comprises an electronic entry method for providing information about the one or more deposit items.

9. A method for processing and tracking merchant deposits, the method comprising:
    receiving, using a computer processing device, a deposit package at a financial institution, wherein one or more deposit items have been placed in the deposit package by a merchant;
    reading, using a computer processing device, visual indicia coupled with the deposit package, wherein the visual indicia is created by the merchant, and wherein the visual indicia contains information about the one or more deposit items that have been placed in the deposit package by the merchant such that reading the visual indicia further comprises receiving an itemized list of the one or more deposit items that have been placed in the deposit package by the merchant, wherein the itemized list is in an electronic form;

verifying the contents of the deposit package in response to reading the visual indicia, wherein an electronic device automatically determines the contents of the deposit package after it has been received, and wherein the electronic device receives the electronic form of the itemized list such that the contents of the deposit package are verified in response to determining whether or not the contents of the deposit package match the itemized list of the one or more deposit items that have been placed in the deposit package by the merchant;

in response to determining the contents of the deposit package do not match the itemized list of the one or more deposit items that have been placed in the deposit package by the merchant, alerting the merchant and the financial institution of a deposit package error; and in response to receiving the alert, automatically tracking the deposit package based at least partially on the visual indicia and determining where the deposit package error originated.

10. The method of claim 9, wherein the merchant has a merchant account maintained by the financial institution, and wherein the method further comprising crediting the merchant account based at least partially on the visual indicia.

11. The method of claim 9, the method further comprising receiving a request for the status of the deposit package.

12. The method of claim 11, wherein tracking the deposit package comprises the module being further configured to track the deposit package based at least partially on the request for the status of the deposit package.

13. The method of claim 9, the method further comprising sending deposit information to one or more entities.

14. The method of claim 9, the method further comprising authenticating the merchant in response to receiving the deposit package at the financial institution.

15. The method of claim 9, wherein the deposit package comprises an electronic entry method for providing information about the one or more deposit items, and wherein the visual indicia is electronically displayed on the deposit package.

16. A computer program product for processing and tracking merchant deposits, the computer program product comprising:

A non-transitory computer-readable medium comprising a set of codes for causing a computer to:

receive a deposit package at a financial institution, wherein one or more deposit items have been placed in the deposit package by a merchant;

read visual indicia coupled with the deposit package, wherein the visual indicia is created by the merchant, and wherein the visual indicia contains information about the one or more deposit items that have been placed in the deposit package by the merchant such that reading the visual indicia further comprises receiving an itemized list of the one or more deposit items that have been placed in the deposit package by the merchant, wherein the itemized list is in an electronic form;

verify the contents of the deposit package in response to reading the visual indicia, wherein an electronic device automatically determines the contents of the deposit package after it has been received, and wherein the electronic device receives the electronic form of the itemized list such that the contents of the deposit package are verified in response to determining whether or not the contents of the deposit package match the itemized list of the one or more deposit items that have been placed in the deposit package by the merchant;

in response to determining the contents of the deposit package do not match the itemized list of the one or more deposit items that have been placed in the deposit package by the merchant, alert the merchant and the financial institution of a deposit package error; and in response to receiving the alert, automatically track the deposit package based at least partially on the visual indicia and determine where the deposit package error originated.

\* \* \* \* \*